US012652119B2

(12) United States Patent
Wang et al.

(10) Patent No.: US 12,652,119 B2
(45) Date of Patent: Jun. 9, 2026

(54) METHOD AND APPARATUS FOR SERVICE PROCESSING IN DUAL CARD TERMINAL DEVICE

(71) Applicant: Honor Device Co., Ltd., Shenzhen (CN)

(72) Inventors: Yun Wang, Shenzhen (CN); Dezhi Wang, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 484 days.

(21) Appl. No.: 18/038,339

(22) PCT Filed: May 9, 2022

(86) PCT No.: PCT/CN2022/091798
§ 371 (c)(1),
(2) Date: May 23, 2023

(87) PCT Pub. No.: WO2023/020028
PCT Pub. Date: Feb. 23, 2023

(65) Prior Publication Data
US 2023/0412295 A1 Dec. 21, 2023

(30) Foreign Application Priority Data

Aug. 19, 2021 (CN) .......................... 202110957090.3
Sep. 6, 2021 (CN) .......................... 202111039764.8

(51) Int. Cl.
*H04W 48/18* (2009.01)
*H04J 11/00* (2006.01)
*H04W 88/06* (2009.01)

(52) U.S. Cl.
CPC ......... *H04J 11/0069* (2013.01); *H04W 48/18* (2013.01); *H04W 88/06* (2013.01)

(58) Field of Classification Search
CPC ... H04J 11/0069; H04W 48/18; H04W 88/06; H04W 76/16; H04W 48/16; H04W 76/27; Y02D 30/70
See application file for complete search history.

(56) References Cited

U.S. PATENT DOCUMENTS 7,251,490 B2 7/2007 Rimoni
8,780,791 B2 7/2014 Hou
(Continued)

FOREIGN PATENT DOCUMENTS

CN 102014466 A 4/2011
CN 105027623 A * 11/2015 .............. H04W 4/16
(Continued)

*Primary Examiner* — Julio R Perez
(74) *Attorney, Agent, or Firm* — Leydig, Voit & Mayer, Ltd.

(57) ABSTRACT

Embodiments of this application provide a method and an apparatus for service processing in a terminal device. The terminal device is provided with a first card and a second card. When the terminal device is using the second card for performing a voice service, if the terminal device receives a data service request that requires the first card for implementation, the terminal device may search for a cell corresponding to a first frequency. The cell corresponding to the first frequency is a cell accessed by the first card before the first card enters an idle state. Therefore, when the terminal device has found the cell corresponding to the first frequency, the voice service of the terminal device is not interrupted. The terminal device can implement both the data service of the first card and the voice service of the second card, allowing more usage scenarios for the terminal device.

15 Claims, 9 Drawing Sheets

(56) References Cited

U.S. PATENT DOCUMENTS

| | | | | |
|---|---|---|---|---|
| 9,271,207 | B1 | 2/2016 | Narendran et al. | |
| 9,480,071 | B2 | 10/2016 | Krishnamoorthy et al. | |
| 10,728,854 | B2 * | 7/2020 | Xia | H04W 76/19 |
| 10,856,350 | B2 | 12/2020 | Qiu et al. | |
| 10,965,327 | B2 * | 3/2021 | Shen | H04W 8/183 |
| 11,432,262 | B2 * | 8/2022 | Huang | H04W 76/16 |
| 11,463,588 | B2 | 10/2022 | Li et al. | |
| 2013/0150032 | A1 * | 6/2013 | Pattaswamy | H04W 52/0229 |
| | | | | 455/434 |
| 2016/0219421 | A1 | 7/2016 | Shi et al. | |
| 2017/0048773 | A1 * | 2/2017 | Miao | H04W 48/18 |
| 2018/0234878 | A1 * | 8/2018 | Anand | H04W 48/16 |
| 2018/0249349 | A1 * | 8/2018 | Hu | H04W 88/06 |
| 2021/0076440 | A1 | 3/2021 | Qiu et al. | |
| 2021/0282206 | A1 | 9/2021 | Zhu et al. | |
| 2021/0410107 | A1 * | 12/2021 | Park | H04W 68/02 |
| 2022/0248278 | A1 | 8/2022 | Huang et al. | |
| 2024/0215101 | A1 * | 6/2024 | Gurumoorthy | H04W 8/183 |

FOREIGN PATENT DOCUMENTS

| | | | | | |
|---|---|---|---|---|---|
| CN | 106100688 | A | | 11/2016 | |
| CN | 108632804 | A | | 10/2018 | |
| CN | 109891933 | A | | 6/2019 | |
| CN | 111918288 | A | | 11/2020 | |
| CN | 112312494 | A | | 2/2021 | |
| CN | 112333772 | A | | 2/2021 | |
| CN | 109315017 | B | | 5/2021 | |
| CN | 113078921 | A | | 7/2021 | |
| CN | 113596810 | A * | 11/2021 | H04W 8/183 |
| CN | 113766484 | A | | 12/2021 | |
| CN | 113924793 | A * | 1/2022 | H04W 8/183 |
| CN | 113993226 | A | | 1/2022 | |
| CN | 114503711 | A * | 5/2022 | H04W 72/00 |
| EP | 3614738 | A1 * | 2/2020 | H04W 48/16 |
| EP | 4087300 | A1 * | 11/2022 | H04W 72/0446 |
| EP | 4436240 | A1 * | 9/2024 | H04L 5/001 |
| JP | 2017539166 | A | | 12/2017 | |
| JP | 2020512762 | A | | 4/2020 | |
| RU | 2380859 | C2 | | 1/2010 | |
| WO | WO-2015180126 | A1 * | 12/2015 | H04W 4/12 |
| WO | WO-2015180140 | A1 * | 12/2015 | H04W 8/183 |
| WO | WO-2020244390 | A1 * | 12/2020 | H04W 76/11 |
| WO | 2021013130 | A1 | | 1/2021 | |
| WO | WO-2022205346 | A1 * | 10/2022 | H04W 72/04 |
| WO | WO-2022226937 | A1 * | 11/2022 | H04W 76/00 |

* cited by examiner

Neither a SIM1 card nor a SIM2 card has a service

The SIM1 card has no data service and the SIM2 card has a voice service

The SIM1 card cannot implement a data service and the SIM2 card has a voice service The SMI1 card has no data service and the SIM2 card has no voice service The SMI1 card has a data service and the SIM2 card has no voice service

METHOD AND APPARATUS FOR SERVICE PROCESSING IN DUAL CARD TERMINAL DEVICE

CROSS-REFERENCE TO RELATED APPLICATIONS

This application is a national stage of International Application No. PCT/CN2022/091798, filed on May 9, 2022, which claims priority to Chinese Patent Application No. 202111039764.8, filed on Sep. 6, 2021, and Chinese Patent Application No. 202110957090.3, filed on Aug. 19, 2021. The disclosures of each of the aforementioned applications are hereby incorporated by reference in their entireties.

TECHNICAL FIELD

This application relates to the field of terminal technologies, and in particular, to a method and an apparatus for service processing in a dual card terminal device.

BACKGROUND

With the development of terminal technologies, dual card terminal devices are developing and put into use so that users can fulfill different requirements by using terminal devices.

However, when one card is connected to a standalone (SA) network and the other card is connected to a long term evolution (LTE) network, it is possible that a terminal device can satisfy call needs of a user by using one card but cannot satisfy internet access needs of the user by using the other card during calls, which limits usage scenarios of the terminal device.

SUMMARY

Embodiments of this application provide a method and an apparatus for service processing in a dual card terminal device. The terminal device is provided with a first card and a second card, the first card supports an SA network, and the second card supports an LTE network. When the terminal device is using the second card for performing a voice service, if the terminal device receives a data service request that requires the first card for implementation, the terminal device may search for a cell corresponding to a first frequency. The cell corresponding to the first frequency is a cell accessed by the first card before the first card enters an idle state. Therefore, when the terminal device has found the cell corresponding to the first frequency and loads radio frequency paths for the first card in the cell corresponding to the first frequency, the terminal device implements no radio frequency path loading procedure for the second card so that the voice service of the terminal device is not interrupted. In this way, the terminal device can implement both the data service of the first card and the voice service of the second card, allowing more usage scenarios for the terminal device.

According to a first aspect, an embodiment of this application provides a method for service processing in a dual card terminal device. The terminal device is provided with a first card and a second card, the first card supports a standalone SA network, and the second card supports a long term evolution LTE network. The method includes: receiving, by the terminal device when the terminal device is using the second card for performing a voice service, a data service request that requires the first card for implementation, where the first card is in an idle state; searching, by the terminal device in response to the data service request, for a cell corresponding to a first frequency, where the cell corresponding to the first frequency is a cell accessed by the first card before the first card enters the idle state; and loading, by the terminal device when the terminal device has found the cell corresponding to the first frequency, radio frequency paths for the first card in the cell corresponding to the first frequency, so as to implement a data service of the first card.

In this way, when the terminal device is using the second card for performing the voice service, if the terminal device receives the data service request that requires the first card for implementation, the terminal device may search for the cell corresponding to the first frequency. The cell corresponding to the first frequency is a cell accessed by the first card before the first card enters the idle state. Therefore, when the terminal device has found the cell corresponding to the first frequency and loads the radio frequency paths for the first card in the cell corresponding to the first frequency, the terminal device implements no radio frequency path loading procedure for the second card so that the voice service of the terminal device is not interrupted. In this way, the terminal device can implement both the data service of the first card and the voice service of the second card, allowing more usage scenarios for the terminal device.

In a possible implementation, the method further includes: determining, by the terminal device when the terminal device is unable to find the cell corresponding to the first frequency, a second frequency connected for performing the voice service of the second card; determining, by the terminal device, a third frequency that matches the second frequency in a first frequency combination, where the first frequency combination includes a frequency connected for performing a data service of the first card and a frequency connected for performing a voice service of the second card; and loading, by the terminal device when the terminal device has found a cell corresponding to the third frequency, radio frequency paths for the first card in the cell corresponding to the third frequency, so as to implement the data service of the first card. In this way, even if the terminal device is unable to find the cell corresponding to the first frequency, the terminal device can load the radio frequency paths for the first card in the cell corresponding to the third frequency, so as to implement the data service of the first card, thereby satisfying both internet access needs and call needs of a user.

In a possible implementation, the method further includes: loading, by the terminal device when the terminal device is loading the radio frequency paths for the first card in the cell corresponding to the third frequency, radio frequency paths for the second card in a cell corresponding to the second frequency. In this way, the terminal device loads the radio frequency paths for both the first card and the second card so that the terminal device performs both the data service and the voice service on the radio frequency paths loaded for the first card and the second card.

In a possible implementation, it takes 1 ms for the terminal device to load the radio frequency paths for the second card in the cell corresponding to the second frequency. It takes a relatively short time for the terminal device to load the radio frequency paths for the second card. Therefore, the call of the second card can be resumed immediately even if the ongoing call of the user is interrupted, so that the user cannot perceive the interruption of the ongoing call. In addition, this allows the user to access the internet with the first card.

In a possible implementation, the radio frequency paths for the second card include a receive path and a transmit path for the second card.

In a possible implementation, the method further includes: searching, by the terminal device when the terminal device is unable to find the cell corresponding to the third frequency, for a cell corresponding to a connectable frequency; and loading, by the terminal device when the terminal device has found the cell corresponding to the connectable frequency, the radio frequency paths for the first card in the cell corresponding to the connectable frequency, so as to implement the data service of the first card. In this way, even if the terminal device is unable to find the cell corresponding to the third frequency, the terminal device can load the radio frequency paths for the first card in the cell corresponding to the connectable frequency, so as to implement the data service of the first card, thereby satisfying both internet access needs and call needs of a user.

In a possible implementation, the method further includes: implementing, by the terminal device, a network discovery procedure for the second card when the terminal device is loading the radio frequency paths for the first card in the cell corresponding to the connectable frequency; and loading, by the terminal device after the terminal device finds a cell corresponding to a frequency in the network discovery procedure, the radio frequency paths for the second card in the cell corresponding to the frequency found. In this way, the terminal device also implements the network discovery procedure and the radio frequency path loading procedure for the second card so that the terminal device can still perform the voice service of the second card.

In a possible implementation, it takes 10 ms for the terminal device to implement the network discovery procedure and load the radio frequency paths for the second card. It takes a relatively short time for the terminal device to implement the network discovery procedure and load the radio frequency paths for the second card. Therefore, the call of the second card can be resumed immediately even if the ongoing call of the user is interrupted, so that the user cannot perceive the interruption of the ongoing call. In addition, this allows the user to access the internet with the first card.

In a possible implementation, the radio frequency paths for the first card include a receive path and a transmit path for the first card.

According to a second aspect, an embodiment of this application provides an apparatus for service processing in a dual card terminal device. The apparatus for service processing in a dual card terminal device may be a terminal device, or a component, chip, or system-on-chip inside a terminal device. The apparatus for service processing in a dual card terminal device may include a processing unit and a communication unit. When the apparatus for service processing in a dual card terminal device is a terminal device, the processing unit may be a processor, and the communication unit may be a communication interface or an interface circuit. The apparatus for service processing in a dual card terminal device may further include a storage unit, which may be a memory. The storage unit is configured to store instructions, and the processing unit executes the instructions stored in the storage unit so that the terminal device implements the method according to any one of the first aspect or the possible implementations of the first aspect. When the apparatus for service processing in a dual card terminal device is a component, chip, or system-on-chip of a terminal device, the processing unit may be a processor, the communication unit may be a communication interface, and the processing unit executes instruction stored in a storage unit so that the terminal device implements the method according to any one of the first aspect or the possible implementations of the first aspect. The storage unit may be a storage unit (for example, a register or a cache) in the chip, or a storage unit (for example, a read-only memory (ROM) or a random access memory (RAM)) in the terminal device but outside the chip. The terminal device is provided with a first card and a second card, the first card supports a standalone SA network, and the second card supports a long term evolution LTE network.

For example, the communication unit is configured to receive, when the terminal device is using the second card for performing a voice service, a data service request that requires the first card for implementation, where the first card is in an idle state. The processing unit is configured to search, in response to the data service request, for a cell corresponding to a first frequency, where the cell corresponding to the first frequency is a cell accessed by the first card before the first card enters the idle state. The processing unit is further configured to load, when the terminal device has found the cell corresponding to the first frequency, radio frequency paths for the first card in the cell corresponding to the first frequency, so as to implement a data service of the first card.

In a possible implementation, the processing unit is further configured to determine, when the terminal device is unable to find the cell corresponding to the first frequency, a second frequency connected for performing the voice service of the second card; determine a third frequency that matches the second frequency in a first frequency combination, where the first frequency combination includes a frequency connected for performing a data service of the first card and a frequency connected for performing a voice service of the second card; and load, when the terminal device has found a cell corresponding to the third frequency, radio frequency paths for the first card in the cell corresponding to the third frequency, so as to implement the data service of the first card.

In a possible implementation, the processing unit is further configured to load, when the terminal device is loading the radio frequency paths for the first card in the cell corresponding to the third frequency, radio frequency paths for the second card in a cell corresponding to the second frequency.

In a possible implementation, it takes 1 ms for the terminal device to load the radio frequency paths for the second card in the cell corresponding to the second frequency.

In a possible implementation, the radio frequency paths for the second card include a receive path and a transmit path for the second card.

In a possible implementation, the processing unit is further configured to search, when the terminal device is unable to find the cell corresponding to the third frequency, for a cell corresponding to a connectable frequency; and load, when the terminal device has found the cell corresponding to the connectable frequency, the radio frequency paths for the first card in the cell corresponding to the connectable frequency, so as to implement the data service of the first card.

In a possible implementation, the processing unit is further configured to implement a network discovery procedure for the second card when the terminal device is loading the radio frequency paths for the first card in the cell corresponding to the connectable frequency; and load, after the terminal device finds a cell corresponding to a frequency in the network discovery procedure, the radio frequency paths for the second card in the cell corresponding to the frequency found.

In a possible implementation, it takes 10 ms for the terminal device to implement the network discovery procedure and load the radio frequency paths for the second card.

In a possible implementation, the radio frequency paths for the first card include a receive path and a transmit path for the first card.

According to a third aspect, an embodiment of this application provides an apparatus for service processing in a dual card terminal device. The apparatus includes a processor and a memory, and the memory is configured to store code instructions, and the processor is configured to run the code instructions so as to perform the method according to any one of the first aspect or the possible implementations of the first aspect.

According to a fourth aspect, an embodiment of this application provides a computer-readable storage medium. The computer-readable storage medium stores computer programs or instructions, and when the computer programs or instructions are run by a computer, the computer performs the method according to any one of the first aspect or the possible implementations of the first aspect.

According to a fifth aspect, an embodiment of this application provides a computer program product including computer programs. When the computer programs are run by a computer, the computer performs the method according to any one of the first aspect or the possible implementations of the first aspect.

According to a sixth aspect, an embodiment of this application provides a system for service processing in a dual card terminal device. The system includes the apparatus according to any one of the second aspect or the possible implementations of the second aspect.

According to a seventh aspect, an embodiment of this application provides a chip or a system-on-chip. The chip or the system-on-chip includes at least one processor and a communication interface. The communication interface and the at least one processor are interconnected by a line. The at least one processor is configured to run computer programs or instructions to perform the method according to any one of the first aspect or the possible implementations of the first aspect. The communication interface in the chip may be an input/output interface, a pin, a circuit, or the like.

In a possible implementation, the chip or the system-on-chip described above in this application further includes at least one memory. The at least one memory stores instructions. The memory may be a storage unit inside the chip, for example, a register or a cache, or a storage unit of the chip (for example, a read-only memory or a random access memory).

It should be noted that the second aspect to the seventh aspect of this application correspond to the first aspect of this application in terms of technical solution, and these aspects and corresponding feasible implementations have similar beneficial effects to the first aspect and feasible implementations thereof. Details are not described herein again.

DESCRIPTION OF EMBODIMENTS

Figure 1:
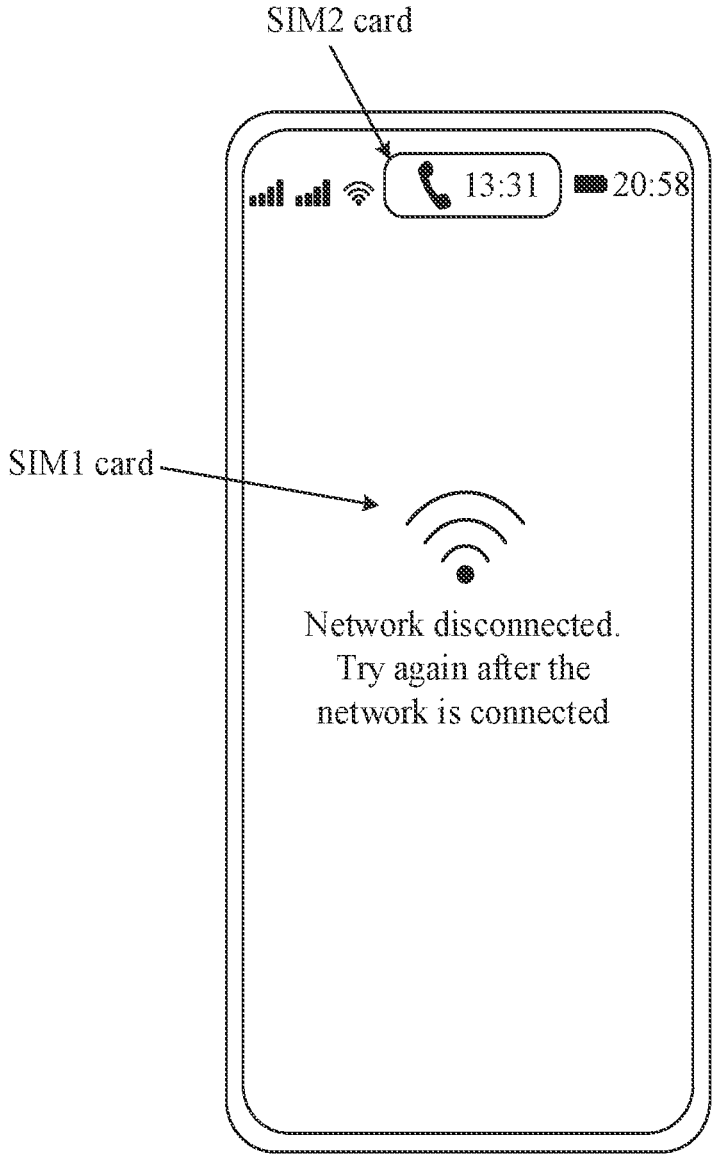
FIG. 1 is a schematic diagram of another application scenario according to an embodiment of this application.

To clearly describe technical solutions in embodiments of this application, terms such as "first" and "second" in the embodiments of this application are used to distinguish between identical or similar items having substantially the same function or purpose. For example, a "first chip" and a "second chip" are merely intended to distinguish between different chips but not to limit a sequential order thereof. A person skilled in the art can understand that the terms such as "first" and "second" do not limit the number or execution order. In addition, the terms such as "first" and "second" do not indicate a definite difference.

It should be noted that in the embodiments of this application, terms such as "an example" or "for example" are used to represent examples, illustrations, or explanations. Any embodiment or design solution described as "an example" or "for example" in this application shall not be construed as being more preferential or advantageous than other embodiments or design solutions. To be precise, the terms such as "an example" or "for example" are intended to present a related concept in a specific manner.

In the embodiments of this application, "at least one" means one or more, and "a plurality of" means two or more. The term "and/or" describes an association relationship between associated objects, and indicates that three relationships may exist. For example, A and/or B may represent the following cases: only A, both A and B, and only B, where A and B may be singular or plural. The character "/" generally indicates an "or" relationship between associated objects. "At least one of the following items (objects)" or a similar expression means any combination of these items, including any combination of a single item (object) or a plurality of items (objects). For example, at least one of a, b, or c may indicate: a, b, c, a and b, a and c, b and c, or a, b, and c, where a, b, and c may be singular or plural.

With the development of terminal technologies, dual card terminal devices are developing and put into use so that users can fulfill different requirements with terminal devices.

However, when one card is connected to a standalone (SA) network, and the other card is connected to a long term evolution (LTE) network, it is possible that a terminal device can satisfy call needs of a user with one card, but cannot satisfy internet access needs of the user with the other card during calls, which limits usage scenarios of terminal devices and provides users with poor experience in using terminal devices.

The one card may be referred to as a main card or a SIM1 card, and the SIM1 card may also be referred to as a data card. The other card may be referred to as a supplementary card or a SIM2 card, and the SIM2 card may also be referred to as a call card. That the terminal device cannot satisfy internet access needs of the user by using the other card can be construed as internet lag occurring when the terminal device accesses the internet by using the other card, so that the internet access needs of the user cannot be satisfied. The internet access need of the user may be a need of the user to open a web page to search for information.

The terminal device uses the SIM2 card to perform a voice service based on voice over long-term evolution (VOLTE). The SIM2 card operates in LTE mode and can support radio access technologies such as LTE and the 3rd generation mobile communication technology (3G). The SIM1 card operates in SA mode and can support radio access technologies such as the 5th generation mobile communication technology (5G) and the 4th generation mobile communication technology (4G). That the SIM2 card operates in LTE mode can be construed as the SIM2 card supporting an LTE network. Similarly, that the SIM1 card operates in SA mode can be construed as the SIM1 card supporting an SA network.

For example, FIG. 1 is a schematic diagram of another application scenario according to an embodiment of this application. As shown in FIG. 1, it can be learned that when a user is using the SIM2 card to make a call, if the user needs to access the internet, the terminal device cannot satisfy the internet access need of the user by using the SIM1 card. As a result, the user can see a reminder message on the terminal device, as shown in FIG. 1. The reminder message reads "Network disconnected. Try again after the network is connected".

With reference to the content shown in FIG. 1, it can be understood that after the call of the SIM2 card ends, the internet access procedure of the SIM1 card activated by the terminal device returns to normal, and therefore the internet access need of the user can be satisfied. Alternatively, it can be understood that when the voice service of the SIM2 card ends, the data service of the SIM2 card returns to normal.

Figure 2:
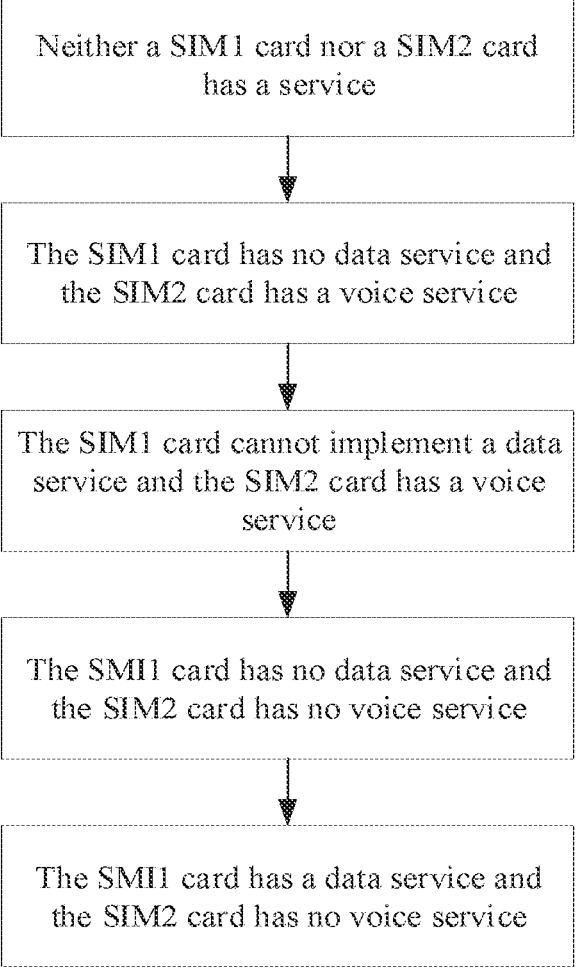
FIG. 2 is a schematic diagram of a dual card service according to an embodiment of this application.

For example, FIG. 2 is a schematic diagram of a dual card service according to an embodiment of this application. As shown in FIG. 2, when a user neither makes a call nor accesses the internet by using the terminal device, that is, when the user is not using the terminal device, neither the SIM1 card nor the SIM2 card has a service, where the SIM1 card has no data service, and the SIM2 card has no voice service. When the user is using the SIM2 card of the terminal device to make a call, the SIM2 card has a voice service, and the SIM1 card has no data service. When the user is using the SIM2 card to make a call, the SIM2 card has a voice service, and if the user needs to access the internet during the call, the terminal device can trigger the SIM1 card. However, the terminal device cannot implement a data service after triggering the SIM1 card, and as a result, the internet access need of the user cannot be satisfied. After the call of the user ends, the SIM2 card has no voice service, and the SIM1 card activated by the terminal device has a data service, so that the internet access need of the user can be satisfied. The voice service can be construed as a call service of the user, and the data service can be construed as an internet service of the user.

It can be understood that the services of the SIM1 card and the SIM2 card of the terminal device during the call have been analyzed in FIG. 2, and statuses of the SIM1 card and the SIM2 card of the terminal device during the call can also be analyzed.

Figure 3:
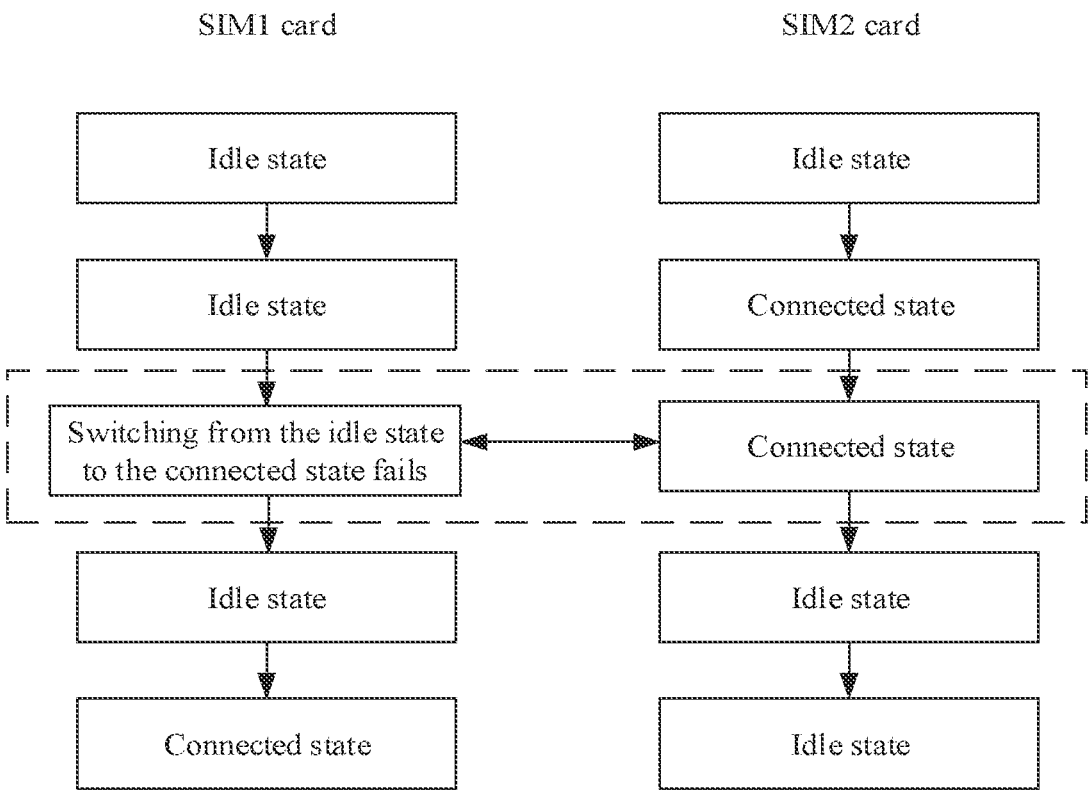
FIG. 3 is a schematic diagram of a dual card status according to an embodiment of this application.

For example, FIG. 3 is a schematic diagram of a dual card status according to an embodiment of this application. As shown in FIG. 3, when the user neither makes a call nor accesses the internet by using the terminal device, both the SIM1 card and the SIM2 card are in an idle state. When the user is using the SIM2 card to make a call, if the user does not need to access the internet, the SIM2 card is in a connected state, and the SIM1 card is in the idle state. During the call using the SIM2 card of the user, the SIM2 card remains in the connected state, and if the user needs to access the internet during the call, the terminal device may trigger the SIM1 card. However, triggering the SIM1 card by the terminal device cannot cause the SIM1 card to switch from the idle state to the connected state, and therefore the SIM1 card fails to switch from the idle state to the connected state and remains in the idle state, which cannot satisfy the internet access need of the user. After the call of the user ends, the SIM2 card enters the idle state so that the SIM1 card triggered by the terminal device can switch from the idle state to the connected state, so as to satisfy the internet access need of the user.

When the SIM2 card of the terminal device is in the connected state, the terminal device has established a link to both a base station and a core network, and when data has arrived at the network, the data can be directly transmitted to the terminal device. The terminal device may also transmit data to the base station and the core network so that the SIM2 card of the terminal device can perform a voice service. When the SIM2 card of the terminal device is in the idle state, there is no link between the terminal device and the base station and the core network, and when data needs to be transmitted, a new link needs to be established between the terminal device and the base station and the core network. The terminal device may receive data but transmits no data to the base station or the core network. In this case, the SIM2 card of the terminal device has no voice service. For descriptions about a case that the SIM1 card is in the idle or connected state, reference may be made to corresponding descriptions of the SIM2 card. Details are not repeated herein again.

Based on the foregoing content, the reason why internet access cannot be performed by using the SIM1 card when the SIM2 card of the terminal device is making a call is further analyzed as follows in the embodiments of this application: When the user is using the SIM2 card of the terminal device to make a call, the SIM2 card switches from the idle state to the connected state. In this case, the terminal device needs to implement a network discovery procedure for the SIM2 card. The network discovery procedure is used by the terminal device to find a connectable frequency for the SIM2 card. Then, the terminal device can implement a radio frequency path loading procedure for the SIM2 card based on the frequency, so that the terminal device can connect to the frequency by using the loaded radio frequency paths. In this way, the terminal device can satisfy the call need of the user by using the SIM2 card.

When the user needs to access the internet during the call, after triggering the SIM1 card, the terminal device needs to switch the SIM1 card from the idle state to the connected state. When the SIM1 card switches from the idle state to the connected state, the terminal device needs to implement a network discovery procedure for the SIM1 card, which makes the terminal device implement a radio frequency path loading procedure for the SIM1 card. The radio frequency path loading procedures for the SIM1 card and the SIM2 card of the terminal device are synchronous, or to put it in another way, the SIM1 card and the SIM2 card of the terminal device use a group form in a radio frequency path loading procedure. Therefore, even if the radio frequency path loading procedures of the SIM1 card and SIM2 card do not collide, the terminal device implements the radio frequency path loading procedure for the SIM2 card again, and then the call service of the SIM2 card is transiently interrupted due to the radio frequency path loading procedure of the SIM2 card.

It can be understood that the network discovery procedure is present during switching of the SIM1 card from the idle state to the connected state. The network discovery procedure may be intra-frequency network discovery or inter-frequency network discovery. In a case of inter-frequency network discovery, the terminal device needs to reload radio frequency paths for the SIM1 card, and simultaneously reloads radio frequency paths for the supplementary card, to transiently interrupt the call of the SIM2 card. Specific content of intra-frequency network discovery and inter-frequency network discovery are described in the following embodiments. Details are not described herein.

Some chips have a limited capability, and a terminal device using such chips does not support internet access using the SIM1 card during the call using the SIM2 card. To put it in another way, when the user needs to access the internet during the call, the terminal device does not implement a network discovery procedure for the SIM1 card, so that the terminal device does not implement a path loading procedure for the SIM1 card. In this case, the terminal device does not implement a radio frequency path loading procedure for the SIM2 card, either, so that the call service of the SIM2 card of the terminal device is not interrupted. As a result, when the user is using the SIM2 card of the terminal device to make a call, the user cannot use the SIM1 card of the terminal device to access the internet.

For some platforms, due to restriction of software architectures of these platforms, these platforms do not allow a network discovery procedure for the SIM1 card to prevent interruption of a voice service of the SIM2 card, making the SIM1 card unable to switch from the idle state to the connected state to implement a data service. The connected state can also be referred to as a service state.

It can be understood that if the terminal device is located in a same cell before performing the voice service and after completing the voice service by using the SIM2 card of the terminal device, a connectable frequency for the SIM2 card of the terminal device remains unchanged. In this way, the terminal device does not need to perform a network discovery procedure or a radio frequency path loading procedure for the SIM2 card. If the terminal device is located in different cells before performing the voice service and after completing the voice service by using the SIM2 card of the terminal device, the terminal device needs to perform a network discovery procedure and a radio frequency path loading procedure for the SIM2 card.

Figure 4:
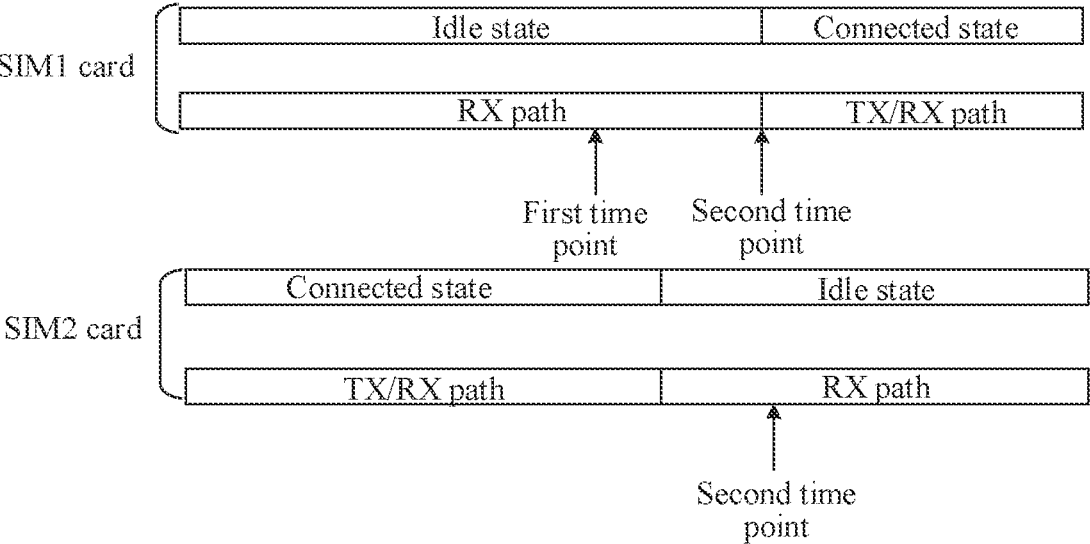
FIG. 4 is a schematic diagram of path loading according to an embodiment of this application.

With reference to the reasons described above, for example, FIG. 4 is a schematic diagram of path loading according to an embodiment of this application. As shown in FIG. 4, when the SIM1 card enters the connected state from the idle state at a first time point, because the SIM2 card is in the connected state, the terminal device does not perform a network discovery procedure for the SIM1 card, so that the terminal device does not perform a path loading procedure for the SIM1 card. As shown in FIG. 4, the terminal device does not perform a receive (RX) path loading procedure for the SIM1 card, making the SIM1 card fail to switch from the idle state to the connected state. When the SIM1 card switches from the idle state to the connected state at a second time point, because the SIM2 card is in the idle state, the terminal device can perform a network discovery procedure for the SIM1 card so that the terminal device performs a path loading procedure for the SIM1 card. As shown in FIG. 4, the terminal device performs receive path and transmit (TX) path loading procedures for the SIM1 card, so that the SIM1 card succeeds in switching from the idle state to the connected state and the terminal device satisfies the internet access need of the user with the SIM1 card. The terminal device also performs a radio frequency path loading procedure for the SIM2 card at the second time point, to be specific, the terminal device performs a receive path loading procedure for the SIM2 card, as shown in FIG. 4. However, the SIM2 card is in the idle state, in other words, the call of the SIM2 card has ended, and therefore the radio frequency path loading procedure performed by the terminal device for the SIM2 card does not affect call quality.

In view of this, an embodiment of this application provides a method for service processing in a dual card terminal device. The terminal device is provided with a first card and a second card, the first card supports an SA network, and the second card supports an LTE network. When the terminal device is using the second card for performing a voice service, if the terminal device receives a data service request that requires the first card for implementation, the terminal device may search for a cell corresponding to a first frequency. The cell corresponding to the first frequency is a cell accessed by the first card before the first card enters the idle state. Therefore, when the terminal device has found the cell corresponding to the first frequency and loads radio frequency paths for the first card in the cell corresponding to the first frequency, the terminal device performs no radio frequency path loading procedure for the second card so that the voice service of the terminal device is not interrupted. In this way, the terminal device can implement both the data service of the first card and the voice service of the second card, allowing more usage scenarios for the terminal device.

It can be understood that the method in this embodiment of this application is a method allowing concurrent implementation of both the data service and the voice service. With the method, constraints of network discovery is broken through so that the user can use one card to make a call and the other card to access data, or to put it in another way, the user can use one card to make a call and the other card to access the internet. In addition, with the method in this embodiment of this application, impact of network discovery on calls is also minimized.

Figure 5:
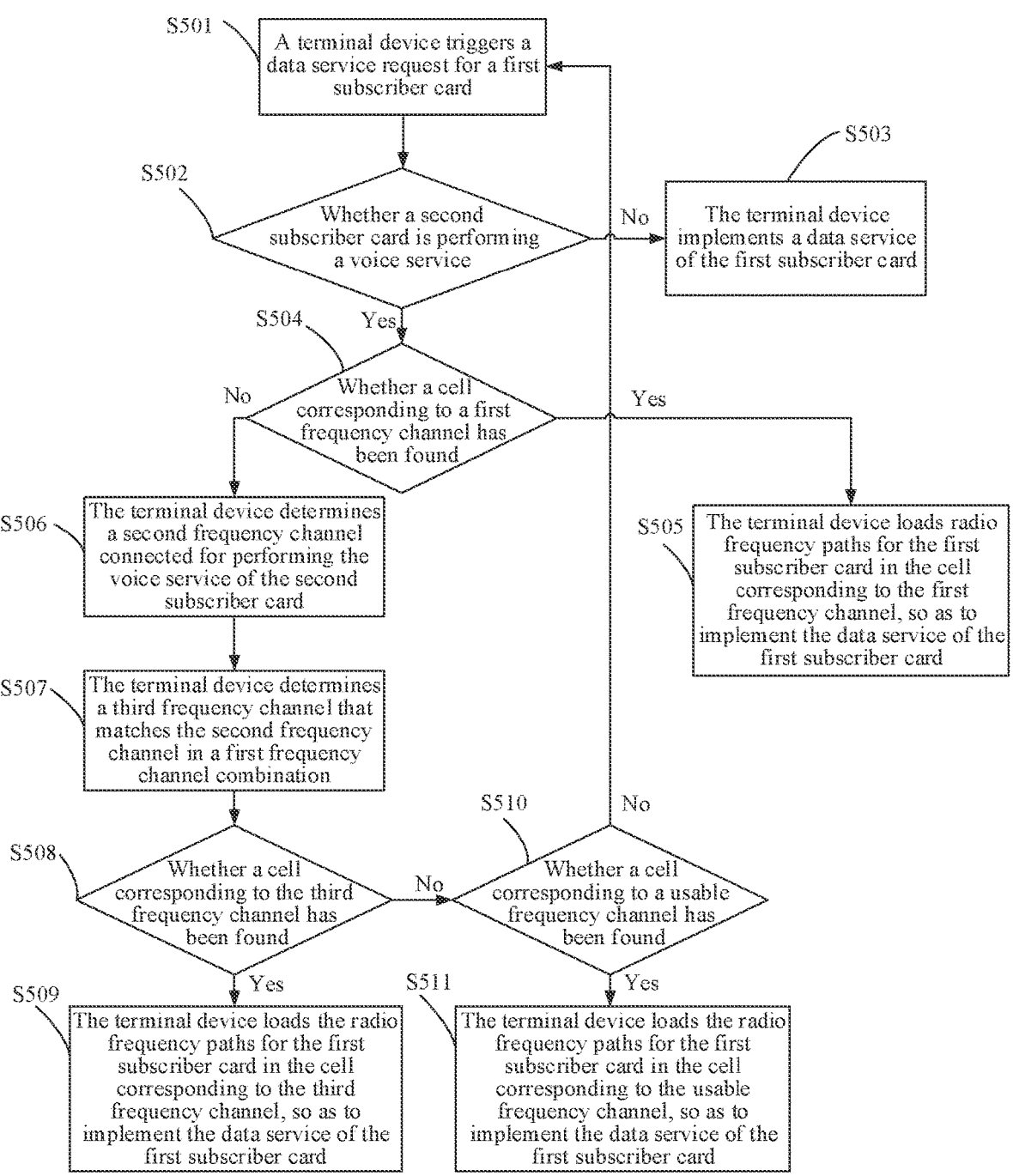
FIG. 5 is a schematic flowchart of a method for service processing in a dual card terminal device.

For example, FIG. 5 is a schematic flowchart of a method for service processing in a dual card terminal device according to an embodiment of this application. In this embodiment of this application, a first subscriber card is the foregoing SIM1 card or the first card, and a second subscriber card is the foregoing SIM2 card or second card. As shown in FIG. 5, the method may include the following steps.

S501: A terminal device triggers a data service request for the first subscriber card.

In this embodiment of this application, the first subscriber card is in an idle state. When the terminal device detects an internet access need of a user, for example, when the user opens an application (APP) of the terminal device, if the terminal device authorizes the APP to access the internet, the terminal device can trigger the data service request for the first subscriber card by identifying APP information, further making the terminal device satisfy the internet access need of the user by using the first subscriber card. The APP information may include a name of the APP and the like, and the data service request can be construed as an internet access request of the user.

S502: The terminal device determines whether the second subscriber card is performing a voice service.

In this embodiment of this application, when the terminal device determines that the second subscriber card is performing a voice service, the terminal device performs S504. When the terminal device determines that the second subscriber card is not performing a voice service, the terminal device performs S503.

S503: The terminal device implements a data service of the first subscriber card.

In this embodiment of this application, because the terminal device determines that the second subscriber card is not performing a voice service, the terminal device can satisfy the internet access need of the user by using the first subscriber card, so that after triggering the data service request for the first subscriber card, the terminal device can implement the data service of the first subscriber card.

When the terminal device determines that the second subscriber card is performing a voice service, if the terminal device needs to access the internet by using the first subscriber card, the terminal device may perform an intra-frequency cell preferred discovery procedure for the first subscriber card, so that the terminal device does not need to reload radio frequency paths for the second subscriber card and the voice service of the second subscriber card is not interrupted. The terminal device performs inter-frequency network discovery only in a case of disconnection of intra-frequency cell. In addition, when performing inter-frequency network discovery, the terminal device may preferentially search for a dual-receive dual card combination, so as to reduce interruption to the call of the second subscriber card, where it takes approximately 1 ms to load the radio frequency paths for the second subscriber card after the terminal device performs inter-frequency network discovery. For a case other than dual-receive dual card combination, it takes approximately 10 ms to load the radio frequency paths for the second subscriber card after the terminal device performs inter-frequency network discovery. Specific content is described in the following steps. Details are not described herein.

S504: Determine whether the terminal device has found a cell corresponding to a first frequency.

In this embodiment of this application, the cell corresponding to the first frequency is a cell accessed by the first subscriber card before the first subscriber card enters the idle state. Therefore, when the terminal device is unable to find the cell corresponding to the first frequency, the terminal device performs S506. When the terminal device has found the cell corresponding to the first frequency, the terminal device performs S505. The terminal device having not found the cell corresponding to the first frequency can be construed as intra-frequency disconnection.

Figure 6:
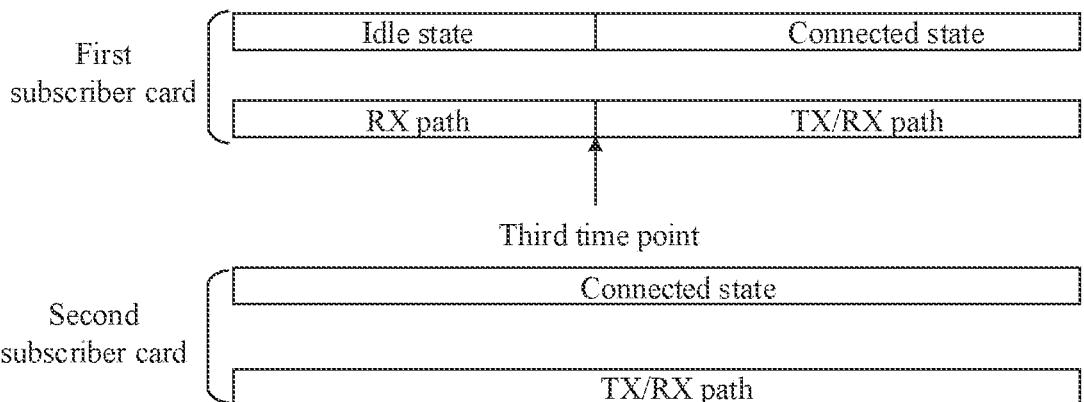
FIG. 6 is a schematic diagram of intra-frequency network discovery according to an embodiment of this application.

A process of searching by the terminal device for the cell corresponding to the first frequency can be construed as an intra-frequency network discovery procedure of the terminal device. For example, FIG. 6 is a schematic diagram of intra-frequency network discovery according to an embodiment of this application. As shown in FIG. 6, when the first subscriber card switches from the idle state to the connected state at a third time point, because the terminal device implements an intra-frequency network discovery procedure for the first subscriber card, after finding the cell corresponding to the first frequency, the terminal device may load radio frequency paths for the first subscriber card in the cell corresponding to the first frequency. As shown in FIG. 6, the terminal device implements receive path and transmit path loading procedures for the first subscriber card. The process of loading by the terminal device the radio frequency paths for the first subscriber card in the cell corresponding to the first frequency does not affect the voice service of the second subscriber card, and therefore the terminal device does not need to reload radio frequency paths for the second subscriber card.

S505: The terminal device loads the radio frequency paths for the first subscriber card in the cell corresponding to the first frequency, so as to implement the data service of the first subscriber card.

In this embodiment of this application, the cell corresponding to the first frequency can be construed as the intra-frequency cell described above. The terminal device loading the radio frequency paths for the first subscriber card in the cell corresponding to the first frequency can be construed as the terminal device adjusting, based on the first frequency, parameters of components in the radio frequency paths for the first subscriber card. For example, the terminal device adjusts parameters of an amplifier, a filter, or the like so that after the terminal device is connected to the first frequency by using the radio frequency paths with parameters adjusted, the terminal device can implement the data service of the first subscriber card so as to satisfy the internet access need of the user, and when the terminal device is implementing the data service of the first subscriber card, the voice service of the second subscriber card is not affected.

S506: The terminal device determines a second frequency connected for performing the voice service of the second subscriber card.

In this embodiment of this application, a telephony module in the terminal device provides functions such as voice, messaging, SIM card management, and the like. Therefore, when providing the voice service of the second subscriber card by using the telephony module, the terminal device may determine, by using the telephony module, the second frequency connected for performing the voice service of the second subscriber card.

S507: The terminal device determines a third frequency that matches the second frequency in a first frequency combination.

In this embodiment of this application, the first frequency combination can be construed as a frequency combination for dual receive dual SIM dual standby (DR-DSDS), and the first frequency combination includes a frequency connected for performing a data service of the first subscriber card and a frequency connected for performing the voice service of the second subscriber card. For example, when the first frequency combination includes [a, b], if the second frequency is b, the terminal device determines the third frequency as a.

It can be understood that specific content of the first frequency combination may be set based on actual application scenarios, which is not limited in this embodiment of this application.

S508: Determine whether the terminal device has found a cell corresponding to the third frequency.

In this embodiment of this application, when the terminal device has found the cell corresponding to the third frequency, the terminal device performs S509. When the terminal device is unable to find the cell corresponding to the third frequency, the terminal device performs S510.

The terminal device having found the cell corresponding to the third frequency can be construed as the first subscriber card and the second subscriber card being a dual-receive dual card combination. The terminal device having not found the cell corresponding to the third frequency can be construed as the first subscriber card and the second subscriber card not being a dual-receive dual card combination.

S509: The terminal device loads the radio frequency paths for the first subscriber card in the cell corresponding to the third frequency, so as to implement the data service of the first subscriber card.

In this embodiment of this application, when the terminal device is loading the radio frequency paths for the first subscriber card in the cell corresponding to the third frequency, the terminal device also reloads radio frequency paths for the second subscriber card. However, a time of reloading the radio frequency paths for the second subscriber card is relatively short, for example, it takes 1 ms to load the radio frequency paths for the second subscriber card. Therefore, even if the ongoing call of the user is interrupted, the user cannot perceive the interruption of the ongoing call, and the call of the second subscriber card can be resumed immediately. In addition, this also allows the user to access the internet by using the first subscriber card.

For specific content about the terminal device loading the radio frequency paths for the first subscriber card in the cell corresponding to the third frequency so as to implement the data service of the first subscriber card, reference may be made to the corresponding description of S505. Details are not repeated herein again.

Figure 7:
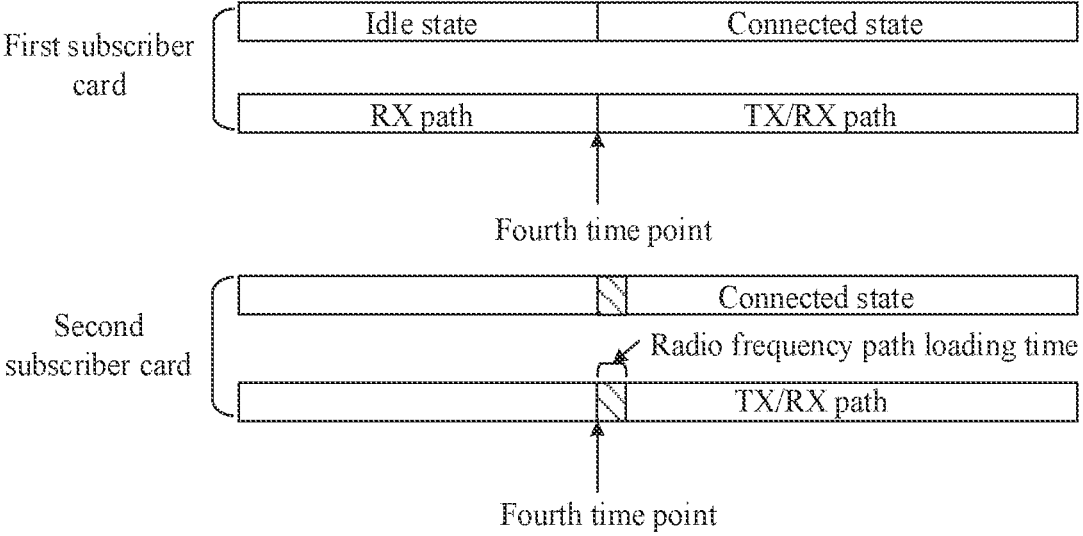
FIG. 7 is a schematic diagram of inter-frequency network discovery according to an embodiment of this application.

A process of searching by the terminal device for the cell corresponding to the third frequency can be construed as an inter-frequency network discovery procedure of the terminal device. For example, FIG. 7 is a schematic diagram of inter-frequency network discovery according to an embodiment of this application. As shown in FIG. 7, when the first subscriber card switches from the idle state to the connected state at a fourth time point, because the terminal device has determined, from the first frequency combination, the third frequency that matches the second frequency, the terminal device may search for the cell corresponding to the third frequency. After finding the cell corresponding to the third frequency, the terminal device may load the radio frequency paths for the first subscriber card in the cell corresponding to the third frequency. As shown in FIG. 7, the terminal device implements receive path and transmit path loading procedures for the first subscriber card. In addition, the terminal device also needs to reload radio frequency paths for the second subscriber card. As shown in FIG. 7, the terminal device implements receive path and transmit path loading procedures for the second subscriber card. Even though the terminal device reloads the radio frequency paths for the second subscriber card, it takes a relatively short time for the terminal device to implement such loading. In addition, because the terminal device does not need to implement a network discovery procedure for the second subscriber card, less time can be taken to resume the voice service of the second subscriber card.

S510: The terminal device determines whether a cell corresponding to a connectable frequency has been found.

In this embodiment of this application, when determining that the cell corresponding to the connectable frequency has not been found, the terminal device performs S501 to S508 so that the terminal device repeats the foregoing process until the terminal device can implement the data service for the first subscriber card. When the terminal device determines that the cell corresponding to the connectable frequency has been found, the terminal device performs S511.

It can be understood that when the terminal device searches for the cell corresponding to the connectable frequency for N times, if the terminal device has found the cell corresponding to the usable frequency in the N times, the terminal device loads radio frequency paths for the first subscriber card in the cell corresponding to the connectable frequency. If the terminal device is unable to find the cell corresponding to the connectable frequency in the N times, the terminal device does not implement the data service with the first card. N is a positive integer greater than or equal to 1.

S511: The terminal device loads the radio frequency paths for the first subscriber card in the cell corresponding to the connectable frequency, so as to implement the data service of the first subscriber card.

In this embodiment of this application, because the terminal device is unable to find the cell corresponding to the third frequency, the terminal device needs to continue the network discovery procedure. After finding the cell corresponding to the connectable frequency, the terminal device loads the radio frequency paths for the first subscriber card in the cell corresponding to the connectable frequency. In addition, the terminal device also needs to perform a network discovery procedure for the second subscriber card. After finding a cell corresponding to a frequency, the terminal device may reload radio frequency paths for the second subscriber card in the cell corresponding to the frequency found. It takes a relatively short time for example, 10 ms for the terminal device to implement the network discovery procedure and load the radio frequency paths for second subscriber card. Therefore, even if the ongoing call of the user is interrupted, the user cannot perceive the interruption of the ongoing call, and the call of the second subscriber card can be resumed immediately. Therefore, the first subscriber card of the terminal device can satisfy the internet access need of the user, and the second subscriber card of the terminal device can also satisfy the call need of the user.

Figure 8:
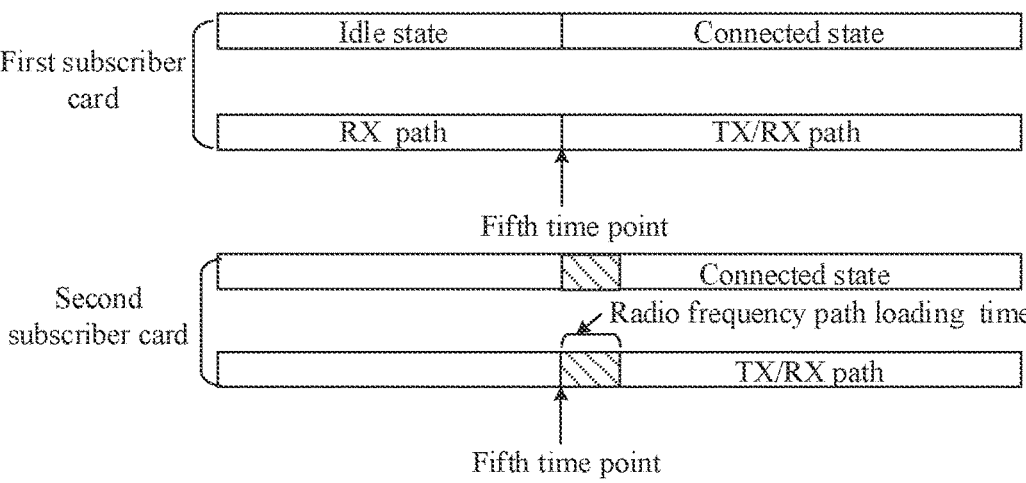
FIG. 8 is another schematic diagram of inter-frequency network discovery according to an embodiment of this application.

A process of searching by the terminal device for the cell corresponding to the connectable frequency can be construed as an inter-frequency network discovery procedure of the terminal device. For example, FIG. 8 is another schematic diagram of inter-frequency network discovery according to an embodiment of this application. As shown in FIG. 8, when the first subscriber card switches from the idle state to the connected state at a fifth time point, the terminal device has found the cell corresponding to the connectable frequency, and therefore may load the radio frequency paths for the first subscriber card in the cell corresponding to the connectable frequency. As shown in FIG. 8, the terminal device implements receive path and transmit path loading procedures for the first subscriber card. In addition, the terminal device also needs to implement a network discovery procedure and a radio frequency path loading procedure for the second subscriber card. As shown in FIG. 8, the terminal device implements receive path and transmit path loading procedures for the second subscriber card.

For specific content about the terminal device loading the radio frequency paths for the first subscriber card in the cell corresponding to the connectable frequency so as to implement the data service of the first subscriber card, reference may be made to the corresponding description of S505. Details are not repeated herein again.

With reference to the foregoing content, it should be noted that generally, if the terminal device has not received a real-time transport protocol (RTP) voice packet within 20 s, the terminal device releases a call so that the voice service is not performed for the second subscriber card of the terminal device. Because 1 ms is <20 s and 10 ms is <20 s, the voice packet of the second subscriber card of the terminal device is not released according to the method shown in FIG. 6. Therefore, the terminal device satisfies the internet access needs of the user by using the first subscriber card and the call need of the user by using the second subscriber card. Although a medium access control (MAC) layer is responsible for scheduling and transmitting a voice packet to the terminal device every 20 ms, the voice packet will not be lost because the maximum number of retransmissions is not reached within 1 ms, and transmission of the voice packet is delayed instead, where the delay is too short to be perceived by the user. In addition, there is no dual-card scenario in MOS test, and therefore the method in the embodiments of this application does not affect MOS test.

With reference to the foregoing content, it can be understood that for some platforms, due to restriction of software architectures of these platforms, these platforms do not allow a network discovery procedure for the SIM1 card to prevent interruption of a voice service of the SIM2 card, making the SIM1 card unable to enter the connected state from the idle state to implement a data service. With the method provided in the embodiments of this application, some platforms can be optimized so that on these platforms, data services of the SIM1 card can be performed while voice services of the SIM2 card are being performed.

The foregoing has described the method for service processing in a dual card terminal device in the embodiments of this application, and the following describes an apparatus for performing the foregoing method for service processing in a dual card terminal device in the embodiments of this application. A person skilled in the art can understand that the method and the apparatus can be combined and refer to each other, and the apparatus for service processing in a dual card terminal device in the embodiments of this application can perform the steps of the method for service processing in a dual card terminal device.

Figure 9:
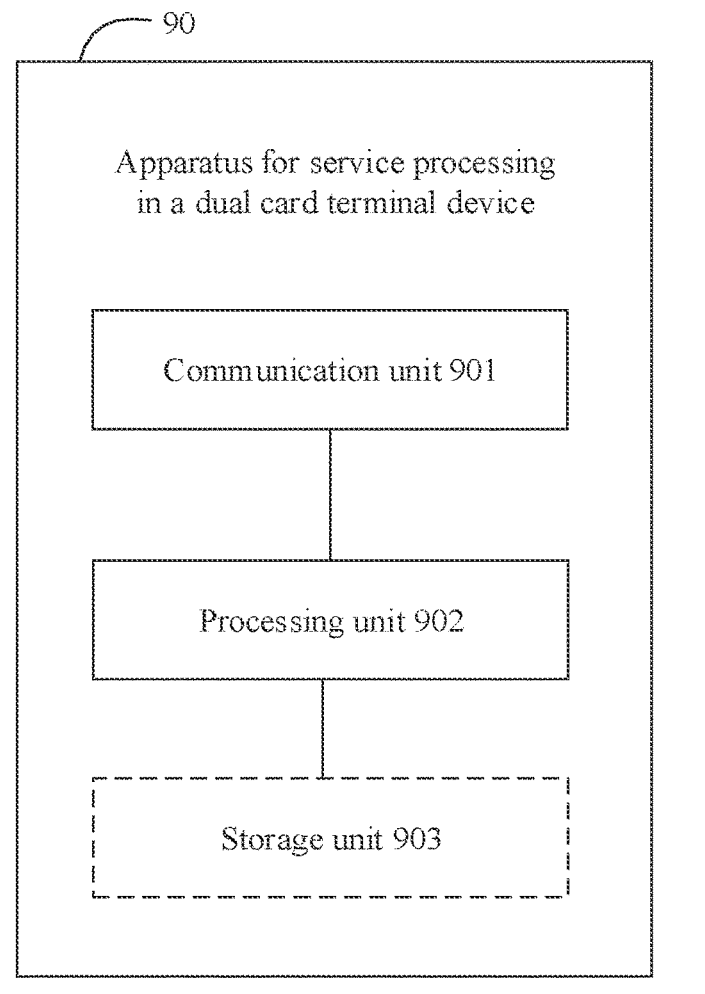
FIG. 9 is a schematic structural diagram of an apparatus for service processing in a dual card terminal device according to an embodiment of this application.

For example, FIG. 9 is a schematic structural diagram of an apparatus for service processing in a dual card terminal device according to an embodiment of this application. As shown in FIG. 9, the apparatus 90 may be a terminal device, or a chip or system-on-chip of a terminal device. The apparatus 90 includes a communication unit 901 and a processing unit 902. The communication unit 901 is configured for the apparatus for service processing in a dual card terminal device to perform a step of transmitting or receiving information, and the processing unit 902 is configured for the apparatus for service processing in a dual card terminal device to perform a step of processing information.

For example, the communication unit 901 is configured to receive, when the terminal device is using a second card for performing a voice service, a data service request that requires a first card for implementation, where the first card is in an idle state. The processing unit 902 is configured to search, in response to the data service request, for a cell corresponding to a first frequency, where the cell corresponding to the first frequency is a cell accessed by the first card before the first card enters the idle state. The processing unit 902 is further configured to load, when the terminal device has found the cell corresponding to the first frequency, radio frequency paths for the first card in the cell corresponding to the first frequency, so as to implement a data service of the first card.

In a possible implementation, the processing unit 902 is further configured to determine, when the terminal device is unable to find the cell corresponding to the first frequency, a second frequency connected for performing the voice service of the second card; determine a third frequency that matches the second frequency in a first frequency combination, where the first frequency combination includes a frequency connected for performing a data service of the first card and a frequency connected for performing a voice service of the second card; and load, when the terminal device has found a cell corresponding to the third frequency, radio frequency paths for the first card in the cell corresponding to the third frequency, so as to implement the data service of the first card.

In a possible implementation, the processing unit 902 is further configured to load, when the terminal device is loading the radio frequency paths for the first card in the cell corresponding to the third frequency, radio frequency paths for the second card in a cell corresponding to the second frequency.

In a possible implementation, it takes 1 ms for the terminal device to load the radio frequency paths for the second card in the cell corresponding to the second frequency.

In a possible implementation, the radio frequency paths for the second card include a receive path and a transmit path for the second card.

In a possible implementation, the processing unit 902 is further configured to search, when the terminal device is unable to find the cell corresponding to the third frequency, for a cell corresponding to a connectable frequency; and load, when the terminal device has found the cell corresponding to the connectable frequency, the radio frequency paths for the first card in the cell corresponding to the connectable frequency, so as to implement the data service of the first card.

In a possible implementation, the processing unit 902 is further configured to implement a network discovery procedure for the second card when the terminal device is loading the radio frequency paths for the first card in the cell corresponding to the connectable frequency; and load, after the terminal device finds a cell corresponding to a frequency in the network discovery procedure, the radio frequency paths for the second card in the cell corresponding to the frequency found.

In a possible implementation, it takes 10 ms for the terminal device to implement the network discovery procedure and load the radio frequency paths for the second card.

In a possible implementation, the radio frequency paths for the first card include a receive path and a transmit path for the first card.

In a possible embodiment, the apparatus for service processing in a dual card terminal device may further include a storage unit 903. The processing unit 902, the communication unit 901, and the storage unit 903 may be connected through a communication bus.

The storage unit 903 may include one or more memories, and the memories may be components for storing programs or data in one or more devices or circuits.

The storage unit 903 may be provided separately and connected to the processing unit 902 of the apparatus for service processing in a dual card terminal device through a communication bus, or may be integrated with the processing unit 902.

The apparatus for service processing in a dual card terminal device may be used for a service processing device, circuit, hardware assembly or chip of the dual card terminal device.

Figure 10:
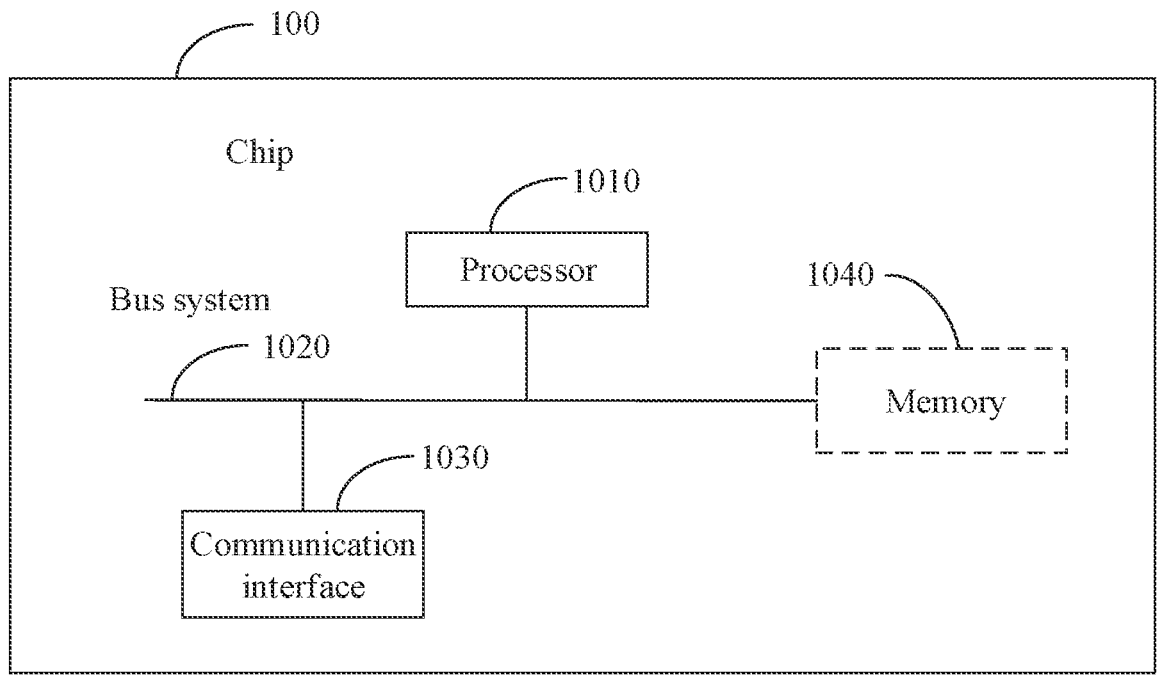
FIG. 10 is a schematic structural diagram of a chip according to an embodiment of this application.

For example, FIG. 10 is a schematic structural diagram of a chip according to an embodiment of this application. The chip 100 includes one or more than two (including two) processors 1010 and communication interfaces 1030.

In some implementations, a memory 1040 stores the following elements: an executable module or a data structure, or a subset thereof, or an extended set thereof.

In this embodiment of this application, the memory 1040 may include a read-only memory and a random access memory, and provides instructions and data to the processor 1010. A part of the memory 1040 may further include a non-volatile random access memory (NVRAM).

In this embodiment of this application, the memory 1040, the communication interface 1030, and the memory 1040 are coupled by using a bus system 1020. The bus system 1020 may further include a power bus, a control bus, a status signal bus, and the like, in addition to a data bus. For ease of description, various buses are marked as the bus system 1020 in FIG.

The methods described in the foregoing embodiments of this application may be applied to the processor 1010 or implemented by the processor 1010. The processor 1010 may be an integrated circuit chip, having a signal processing capability. During implementation, the steps of the foregoing method can be completed by hardware integrated logic circuits in the processor 1010 or instructions in the form of software. The foregoing processor 1010 may be a general purpose processor (for example, a microprocessor or a conventional processor), a digital signal processor (DSP), an application specific integrated circuit (ASIC), a field-programmable gate array (FPGA) or another programmable logic device, a discrete gate, a transistor logic device, or a discrete hardware component. The processor 1010 can implement or execute the methods, steps, and logical block diagrams disclosed in the embodiments of the present disclosure.

The steps of the methods with reference to the embodiments of this application may be directly implemented by a hardware decoding processor, or may be implemented by a combination of hardware and software modules in a decoding processor. The software module may be located in a storage medium mature in the art, such as a random access memory, a read-only memory, a programmable read-only memory, or an electrically erasable programmable read only memory (EEPROM). The storage medium is located in the memory 1040, and the processor 1010 fetches information in the memory 1040, and completes the steps of the foregoing method in combination with its hardware.

Figure 11:
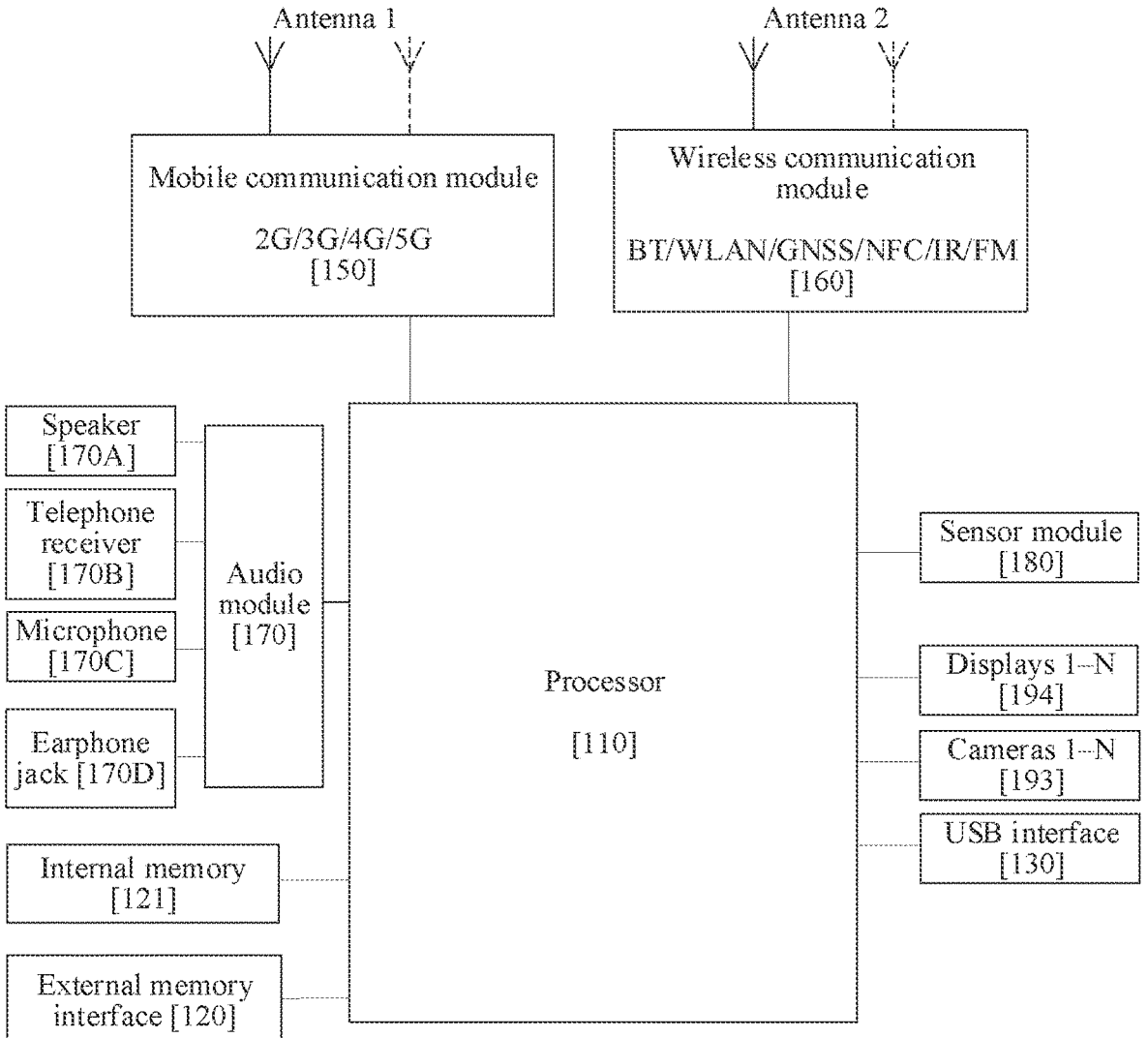
FIG. 11 is a schematic diagram of a hardware structure of a terminal device according to an embodiment of this application.

For example, FIG. 11 is a schematic diagram of a hardware structure of a terminal device according to an embodiment of this application. The terminal device may include a processor 110, an external memory interface 120, an internal memory 121, a universal serial bus (USB) interface 130, an antenna 1, an antenna 2, a mobile communication module 150, a wireless communication module 160, an audio module 170, a speaker 170A, a telephone receiver 170B, a microphone 170C, an earphone jack 170D, a sensor module 180, and the like.

It can be understood that the structure illustrated in this embodiment of the present disclosure does not constitute a specific limitation on the terminal device. In some other embodiments of this application, the terminal device may include more or fewer components than those shown in the figure, or combine some of the components, split some of the components, or arrange the components differently. The components shown in the figure may be implemented in hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, a neural-network processing unit (NPU), and/or the like. Different processing units may be separate devices or may be integrated into one or more processors.

The processor 110 may be further provided with a memory for storing instructions and data. In some embodiments, the memory in the processor 110 is a cache memory. The memory may store instructions or data just used or repeatedly used by the processor 110. If the processor 110 needs to use the instructions or the data again, the processor 110 may directly call the instructions or the data from the memory. This avoids repeated access and reduces waiting time of the processor 110, thereby improving system efficiency.

In some embodiments, the processor 110 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) interface, and/or the like.

A wireless communication function of the terminal device may be implemented by using the antenna 1, the antenna 2, the mobile communication module 150, the wireless communication module 160, the modem processor, the baseband processor, and the like.

The antenna 1 and the antenna 2 are configured to transmit and receive an electromagnetic wave signal. Each antenna of the terminal device may be configured to cover one or multiple communication bands. Different antennas may be further used to increase antenna utilization. For example, the antenna 1 may be used as a diversity antenna of a wireless local area network. In some other embodiments, the antenna may be used in combination with a tuning switch.

The mobile communication module 150 may provide a wireless communication solution including 2G/3G/4G/5G and the like to be applied to the terminal device. The mobile communication module 150 may include at least one filter, a switch, a power amplifier, a low noise amplifier (LNA), and the like. The mobile communication module 150 may receive an electromagnetic wave by using the antenna 1, perform processing such as filtering and amplification on the electromagnetic wave received, and transmit the electromagnetic wave processed to the modem processor for demodulation. The mobile communication module 150 may further amplify a signal modulated by the modem processor, and transmit the signal as an electromagnetic wave by using the antenna 1. In some embodiments, at least some functional modules of the mobile communication module 150 may be provided in the processor 110. In some embodiments, at least some functional modules of the mobile communication module 150 and at least some modules of the processor 110 may be provided in a same device.

The wireless communication module 160 may provide wireless communication solutions such as a wireless local area network (WLAN) (for example, a wireless fidelity (Wi-Fi) network), Bluetooth (BT), a global navigation satellite system (GNSS), frequency modulation (FM), a near field communication (NFC) technology, and an infrared (IR) technology to be applied on the terminal device. The wireless communication module 160 may be one or more components integrating at least one communication processing module. The wireless communication module 160 receives an electromagnetic wave by using the antenna 2, performs frequency modulation and filtering processing on the electromagnetic wave signal, and transmits the signal processed to the processor 110. The wireless communication module 160 may further receive, from the processor 110, a signal to transmit, perform frequency modulation and amplification on the signal, and transmit the signal as an electromagnetic wave by using the antenna 2.

In this embodiment of this application, the terminal device may use the mobile communication module 150 or the wireless communication module 160 to implement a data service of a first card and/or a voice service of a second card.

In some embodiments, the antenna 1 of the terminal device is coupled to the mobile communication module 150, and the antenna 2 is coupled to the wireless communication module 160, so that the terminal device can communicate with a network and another device by using a wireless communication technology. The wireless communication technology may include global system for mobile communications (GSM), general packet radio service (GPRS), code division multiple access (CDMA), wideband code division multiple access (WCDMA), time-division code division multiple access (TD-SCDMA), long term evolution (LTE), BT, GNSS, WLAN, NFC, FM, an IR technology, and/or the like. The GNSS may include the global positioning system (GPS), the global navigation satellite system (GLONASS), the Beidou navigation satellite system (BDS), and the quasi-zenith satellite system (QZSS), and/or satellite based augmentation systems (SBAS).

The terminal device implements a display function by using a GPU, the display 194, an application processor, and the like. The GPU is an image processing microprocessor and is connected to the display 194 and the application processor. The GPU is configured to perform mathematical and geometric computation for graphics rendering. The processor 110 may include one or more GPUs that execute program instructions to generate or change display information.

The display 194 is configured to display images, videos, and the like. The display 194 includes a display panel. The display panel may be a liquid crystal display (LCD), an organic light-emitting diode (OLED), an active-matrix organic light emitting diode (AMOLED), a flexible light-emitting diode (FLED), Miniled, MicroLed, Micro-oLed, a quantum dot light emitting diode (QLED), or the like. In some embodiments, the terminal device may include one or N displays 194, where N is a positive integer greater than 1.

The terminal device may implement a shooting function by using the ISP, the camera 193, the video codec, the GPU, the display 194, an application processor, and the like.

The ISP is configured to process data fed back by the camera 193. For example, during photographing, a shutter is open, allowing light to be transmitted to a photosensitive element of the camera through a lens. An optical signal is converted into an electrical signal. The photosensitive element of the camera transfers the electrical signal to the ISP for processing, so as to convert the electrical signal into an image visible to the naked eye. The ISP may further optimize noise, brightness, and skin color of the image using algorithms. The ISP may further optimize parameters such as exposure and color temperature of a shooting scene. In some embodiments, the ISP may be disposed in the camera 193.

The camera 193 is configured to capture a static image or a video. An optical image is generated for an object by using a lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transfers the electrical signal to the ISP to convert the electrical signal into a digital image signal. The ISP outputs the digital image signal to the DSP for processing. The DSP converts the digital image signal into an image signal in a standard format such as RGB or YUV. In some embodiments, the terminal device may include one or N cameras 193, where N is a positive integer greater than 1.

The digital signal processor is configured to process digital signals, including not only digital image signals but also other digital signals. For example, when the terminal device selects a frequency, the digital signal processor is configured to perform Fourier transform and the like on energy of the frequency.

The video codec is configured to compress or decompress a digital video. The terminal device may support one or more types of video codecs, so that the terminal device can play or record videos of multiple encoding formats, such as moving picture experts group (MPEG) 1, MPEG2, MPEG3, and MPEG4.

The external memory interface 120 may be configured to connect an external memory card, such as a Micro SD card, to expand a storage capacity of the terminal device. The external memory card communicates with the processor 110 by using the external memory interface 120 to implement a data storage function. For example, files such as music and videos are stored in the external memory card.

The internal memory 121 may be configured to store computer executable program code, where the executable program code includes instructions. The processor 110 performs various function applications and data processing of the terminal device by executing the instructions stored in the internal memory 121. The internal memory 121 may include a storage program area and a storage data area. The storage program area may store an operating system, an application required by at least one function (for example, a sound play function and an image play function), and the like. The data storage area may store data (for example, audio data and contacts) created during the use of the terminal device. In addition, the internal memory 121 may include a high-speed random access memory, or may include a non-volatile memory such as at least one magnetic disk storage device, a flash memory device, and a universal flash storage (UFS).

The terminal device may implement an audio function such as playing music or recording by using the audio module 170, the speaker 170A, the telephone receiver 170B, the microphone 170C, the earphone jack 170D, the application processor, and the like.

The audio module 170 is configured to convert digital audio information into an analog audio signal for output, and is also configured to convert an analog audio input into a digital audio signal. The audio module 170 may be further configured to encode and decode an audio signal. In some embodiments, the audio module 170 may be provided in the processor 110, or some functional modules of the audio module 170 may be provided in the processor 110.

The speaker 170A, also referred to as a "loudspeaker", is configured to convert audio an electrical signal into a sound signal. With the speaker 170A, the terminal device may be used for listening to music or answering a call.

The telephone receiver 170B, also referred to as an "earpiece", is configured to convert an audio electrical signal into a sound signal. When the terminal device is used to answer a call or play a voice message, a user may move the telephone receiver 170B close to an ear to hear a voice.

The microphone 170C, also referred to as a "mic" or "mike", is configured to convert a sound signal into an electrical signal. When making a call or sending a voice message, a user may input a sound signal into the microphone 170C by speaking close to the microphone 170C. The terminal device may be provided with at least one microphone 170C. In some other embodiments, the terminal device may be provided with two microphones 170C, to reduce noise in addition to collecting sound signals. In some other embodiments, the terminal device may alternatively be provided with three, four, or more microphones 170C to collect sound signals, reduce noise, identify a sound source, implement directional recording, and the like.

The earphone jack 170D is configured to connect a wired headset. The earphone jack 170D may be the USB interface 130, or may be a 3.5 mm open mobile terminal platform (OMTP) standard interface, or a cellular telecommunications industry association of the USA (CTIA) standard interface.

The sensor module 180 may include a pressure sensor, a gyro sensor, a barometric pressure sensor, a magnetic sensor, an acceleration sensor, a distance sensor, an optical proximity light sensor, a fingerprint sensor, a temperature sensor, a touch sensor, an ambient light sensor, a bone conduction sensor, and the like.

It can be understood that the terminal device may further include a charge management module, a power management module, a battery, a button, an indicator, one or more SIM card interfaces, and the like. This is not limited in the embodiments of this application.

In the foregoing embodiment, the instruction stored by the memory and executed by the processor may be implemented in a form of a computer program product. The computer program product may be written into the memory in advance, or may be downloaded to and installed in the memory in a form of software.

The computer program product includes one or more computer instructions. When computer program instructions are loaded and executed on a computer, the processes or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. For example, the usable medium may include a magnetic medium (for example, a floppy disk, a hard disk, or a magnetic tape), an optical medium (for example, a digital versatile disc (DVD)), a semiconductor medium (for example, a solid state disk (SSD)), or the like.

An embodiment of this application further provides a computer-readable storage medium. The methods described in the foregoing embodiments may be all or partially implemented by using software, hardware, firmware, or any combination thereof. The computer-readable medium may include a computer storage medium and a communication medium, and may further include any medium that can enable a computer program to be transmitted from one place to another place. The storage medium may be any target medium accessible by a computer.

As a possible design, the computer-readable medium may include a compact disc read-only memory (CD-ROM), a RAM, a ROM, an EEPROM or other disc storage. The computer-readable medium may include magnetic disk storage or other magnetic disk storage devices. Any connecting line may also be properly termed a computer-readable medium. For example, if software is transmitted from a website, a server, or another remote source by using a coaxial cable, an optical cable, a twisted pair, a DSL, or a wireless technology (for example, infrared, radio, or microwave), the coaxial cable, the optical cable, the twisted pair, the DSL, or the wireless technology such as infrared, radio, or microwave is included in the definition of medium. Disks and discs, as used herein, include compact disc (CD), laser disc, optical disc, digital versatile disc (DVD), floppy disk, and Blu-ray disc, where disks usually reproduce data magnetically, while discs reproduce data optically with lasers.

A combination of the foregoing should also be included in the protection scope of the computer-readable medium. The foregoing is only specific embodiments of the present disclosure and not intended to limit the protection scope of the present disclosure. Any variations or replacements readily figured out by a person skilled in the art within the technical scope disclosed by the present disclosure shall fall within the protection scope of the present disclosure. Therefore, the protection scope of the present disclosure shall be subject to the protection scope of the claims.

What is claimed is:

1. A method for service processing in a dual card terminal device, wherein the terminal device supports communication through a first network corresponding to a first subscriber identity module (SIM) card and supports communication through a second network corresponding to a second SIM card, the method comprising:

receiving, by the terminal device when the terminal device is using a second frequency of the second network for performing a voice service and the terminal device is in an idle state on the first network, a data service request;

searching, by the terminal device in response to the data service request, for a first cell corresponding to a first frequency, wherein the first cell comprises a cell accessed by the terminal device before entering the idle state in the first network; and implementing, by the terminal device when the terminal device has found the first cell corresponding to the first frequency, a data service of the first SIM card on the first network.

2. The method according to claim 1, further comprising:

determining, by the terminal device when the terminal device has not found the first cell, a third frequency that matches the second frequency in a first frequency combination, wherein the first frequency combination includes a combination of the second frequency and the third frequency, and the third frequency is a frequency of the first network, wherein the terminal device supports performing a voice service at the second frequency while performing a data service at the third frequency; and implementing, by the terminal device when the terminal device has found a cell corresponding to the third frequency, the data services of the first SIM card on the first network.

3. The method according to claim 2, further comprising:

searching, by the terminal device when the terminal device has not found the cell corresponding to the third frequency, for a cell corresponding to a connectable frequency.

4. The method according to claim 1, further comprising:

executing synchronously a first loading procedure of the terminal device on a first radio frequency path corresponding to the first SIM card and a second loading procedure of the terminal device on a second radio frequency path corresponding to the second SIM card.

5. The method according to claim 1, wherein the first network is a standalone (SA) network, and the second network is a long term evolution (LTE) network.

6. The method according to claim 2, further comprising:

loading, by the terminal device, radio frequency paths for the first SIM card in the cell corresponding to the third frequency.

7. An apparatus for service processing, the apparatus comprising:

a processor; and a memory, wherein the memory is configured to store code instructions, the apparatus supports communication through a first network corresponding to a first subscriber identity module (SIM) card and supports communication through a second network corresponding to a second SIM card, wherein the processor is configured to execute the code instructions to implement operations comprising:

receiving, by the apparatus when the apparatus is using a second frequency of the second network for performing a voice service and the apparatus is in an idle state on the first network, a data service request;

searching, by the apparatus in response to the data service request, for a first cell corresponding to a first frequency, wherein the first cell comprises a cell accessed by the apparatus before entering the idle state in the first network; and implementing, by the apparatus when the apparatus has found the first cell corresponding to the first frequency, a data service of the first SIM card on the first network.

8. The apparatus according to claim 7, wherein the operations further comprise:

determining, by the apparatus when the apparatus has not found the first cell, a third frequency that matches the second frequency in a first frequency combination, wherein the first frequency combination includes a combination of the second frequency and the third frequency, and the third frequency is a frequency of the first network, wherein the apparatus supports performing a voice service at the second frequency while performing a data service at the third frequency; and implementing, by the apparatus when the apparatus has found a cell corresponding to the third frequency, the data service of the first SIM card on the first network.

9. The apparatus according to claim 8, wherein the operations further comprise:

searching, by the apparatus when the apparatus has not found the cell corresponding to the third frequency, for a cell corresponding to a connectable frequency.

10. The apparatus according to claim 7, wherein the operations further comprise:

executing synchronously a first loading procedure of the apparatus on the first radio frequency path corresponding to the first SIM card and a second loading procedure of the apparatus on the second radio frequency path corresponding to the second SIM card.

11. The apparatus according to claim 7, wherein the first network is a standalone (SA) network, and the second network is a long term evolution (LTE) network.

12. The apparatus according to claim 8, wherein the operations further comprise:

loading, by the apparatus, radio frequency paths for the first SIM card in the cell corresponding to the third frequency.

13. A chip or a system-on-chip, wherein the chip or the system-on-chip supports communication through a first network corresponding to a first subscriber identity module (SIM) card and supports communication through a second network corresponding to a second SIM card, wherein the chip or the system-on-chip includes at least one processor and a communication interface, the at least one processor is configured to run computer programs or instructions to implement operations comprising:

receiving, by the chip or the system-on-chip when the chip or the system-on-chip is using a second frequency of the second network for performing a voice service and the chip or the system-on-chip is in an idle state on the first network, a data service request;

searching, by the chip or the system-on-chip in response to the data service request, for a first cell corresponding to a first frequency, wherein the first cell comprises a cell accessed by the chip or the system-on-chip before entering the idle state in the first network; and implementing, by the chip or the system-on-chip when the chip or the system-on-chip has found the first cell corresponding to the first frequency, a data service of the first SIM card on the first network.

14. The chip or a system-on-chip according to claim 13, wherein the operations further comprise:

determining, by the chip or the system-on-chip when the chip or the system-on-chip has not found the first cell, a third frequency that matches the second frequency in a first frequency combination, wherein the first frequency combination includes a combination of the second frequency and the third frequency, and the third frequency is a frequency of the first network, and wherein the chip or the system-on-chip supports performing voice services at the second frequency while performing a data services at the third frequency; and implementing, by the chip or the system-on-chip based on the chip or the system-on-chip has found a cell corresponding to the third frequency, the data service of the first SIM card on the first network.

15. The chip or a system-on-chip according to claim 14, wherein the operations further comprise:

searching, by the chip or the system-on-chip when the chip or the system-on-chip has not found the cell corresponding to the third frequency, for a cell corresponding to a connectable frequency.

* * * * *